(12) United States Patent
King

(10) Patent No.: US 11,002,542 B1
(45) Date of Patent: May 11, 2021

(54) LASER LEVEL WITH A MEASUREMENT DISPLAY WINDOW

(71) Applicant: Jeffrey King, E Orange, NJ (US)

(72) Inventor: Jeffrey King, E Orange, NJ (US)

( * ) Notice: Subject to any disclaimer, the term of this patent is extended or adjusted under 35 U.S.C. 154(b) by 0 days.

(21) Appl. No.: 16/752,866

(22) Filed: Jan. 27, 2020

(51) Int. Cl.
　　*G01C 15/00* (2006.01)
　　*G01B 11/02* (2006.01)
　　*G01C 9/02* (2006.01)

(52) U.S. Cl.
　　CPC .......... *G01C 15/008* (2013.01); *G01B 11/026* (2013.01); *G01C 9/02* (2013.01); *G01C 15/004* (2013.01)

(58) Field of Classification Search
　　CPC ...... G01C 15/008; G01C 15/004; G01C 9/02; G01B 11/026
　　USPC .......................................................... 33/290
　　See application file for complete search history.

(56) References Cited

U.S. PATENT DOCUMENTS

| | | | |
|---|---|---|---|
| 6,497,051 B1* | 12/2002 | Poole | G01B 3/16 33/27.02 |
| 7,237,341 B2 | 7/2007 | Murray | |
| 7,448,138 B1* | 11/2008 | Vanneman | G01C 15/006 33/290 |
| 8,826,553 B2* | 9/2014 | Kahle | G01C 15/004 33/290 |
| 2003/0131491 A1* | 7/2003 | Weeks | G01B 3/1061 33/762 |
| 2008/0112700 A1* | 5/2008 | Foxenland | G03B 13/02 396/148 |
| 2008/0120853 A1* | 5/2008 | Munroe | G01B 11/26 33/286 |
| 2014/0123508 A1* | 5/2014 | Graesser | G01C 15/002 33/228 |
| 2014/0352161 A1* | 12/2014 | Ranieri | G01C 15/004 33/291 |
| 2018/0356223 A1* | 12/2018 | Lukic | G01C 15/008 |
| 2018/0356249 A1* | 12/2018 | Lukic | G01C 15/008 |
| 2019/0063921 A1 | 2/2019 | George | |
| 2019/0331488 A1* | 10/2019 | Corrigan | G01B 11/26 |
| 2020/0064132 A1* | 2/2020 | Schubert | G01C 9/02 |
| 2020/0240783 A1* | 7/2020 | Eidinger | G01C 15/004 |

\* cited by examiner

*Primary Examiner* — Yaritza Guadalupe-McCall
(74) *Attorney, Agent, or Firm* — Sanchelima & Associates, P.A.; Christian Sanchelima; Alexander Rodriguez

(57) ABSTRACT

A laser level with a measurement display window is disclosed herein. The self-leveling laser level and measurement locating instrument includes a rectangular body with multiple laser light outputs wherein the color of the light beam can be changed from either green or red. Additionally, the leveling tool can be secured to a metal surface using a magnet and can be mounted to a tripod or hand carried. The laser level also has a display window for displaying the measurement indicia acquired by the laser lines. Furthermore, the laser level is configured to take measurements either horizontally or vertically.

8 Claims, 5 Drawing Sheets

LASER LEVEL WITH A MEASUREMENT DISPLAY WINDOW

BACKGROUND OF THE INVENTION

1. Field of the Invention

The present invention relates to laser level and, more particularly, to a laser level with a measurement display window that allows a user to switch between a red laser and a green laser for accurate measurements.

2. Description of the Related Art

Several designs for a laser level have been designed in the past. None of them, however, include a self-leveling laser level and measurement locating instrument comprising a rectangular body with multiple laser light outputs wherein the color of the light beam can be changed from either green or red. Additionally, the leveling tool can be secured to a metal surface using a magnet and can be mounted to a tripod or hand carried. The laser level also has a display window for displaying the measurement indicia acquired by the laser lines. Furthermore, the laser level is configured to take measurements either horizontally or vertically. It is known that user's often user laser levels in order to take accurate measurements for a wall surface in order to mount various objects and furniture. It is also known that the present laser levels lack the advantage of being able to switch between the color of lasers that are used such as red and green. The different color would allow a user to adapt to the lighting environment of their workspace thereby providing more accurate measurements. Additionally, the present laser levels lack a display window that can display the measurements that are acquired by the laser in order to provide a user with accurate measurements of a wall. Therefore, there is a need for a laser level with a measurement display window and the ability to switch between different colors of lasers.

Applicant believes that a related reference corresponds to U.S. patent publication No. 2019/0063921 issued for a measuring tool and laser level with a display screen for showing the laser acquired measurements. Applicant believes that another related reference corresponds to U.S. Pat. No. 7,237,341 issued for a laser level tool with a digital display for displaying the measurements read by the laser. Additionally, applicant believes a related product corresponds to the Dewalt DW089LG 12 v green line laser. However, the cited references differ from the present invention because they lack the novel combination of the functionality of having two different color lasers and the measurement display window to aid the user. Additionally, the present invention includes the functionality of being able to mount the laser level to a tripod or a wall for stable and accurate measurements.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a laser level having two different color lasers to provide a user with optimal visibility in different working environments.

It is another object of this invention to provide a laser level including a display window that displays measurements read by the laser in either imperial measurements or metric measurements to aid a user in taking measurements of a surface area.

It is still another object of the present invention to provide a laser level that is configured to be mounted to a tripod or magnetically mounted to a wall to provide an optimal measuring environment.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
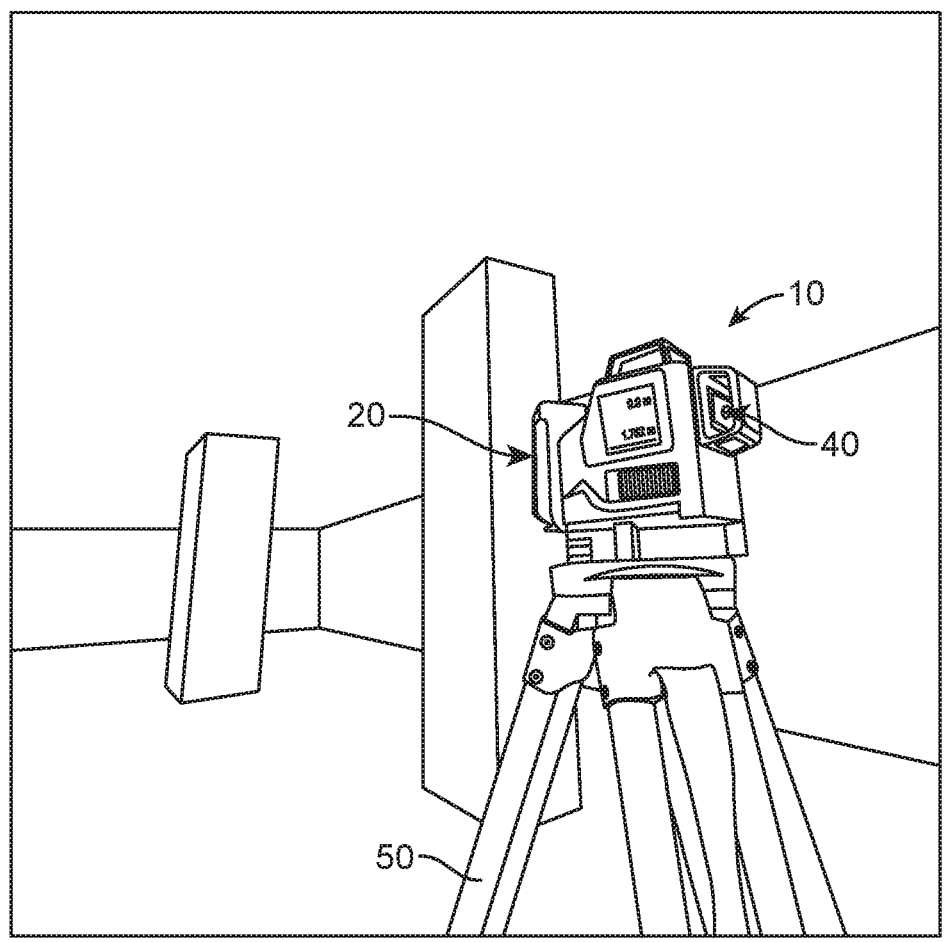
FIG. 1 represents an isometric view of laser level 10 in an operational setting being mounted onto a tripod 00 in accordance to an embodiment of the present invention.
Figure 2:
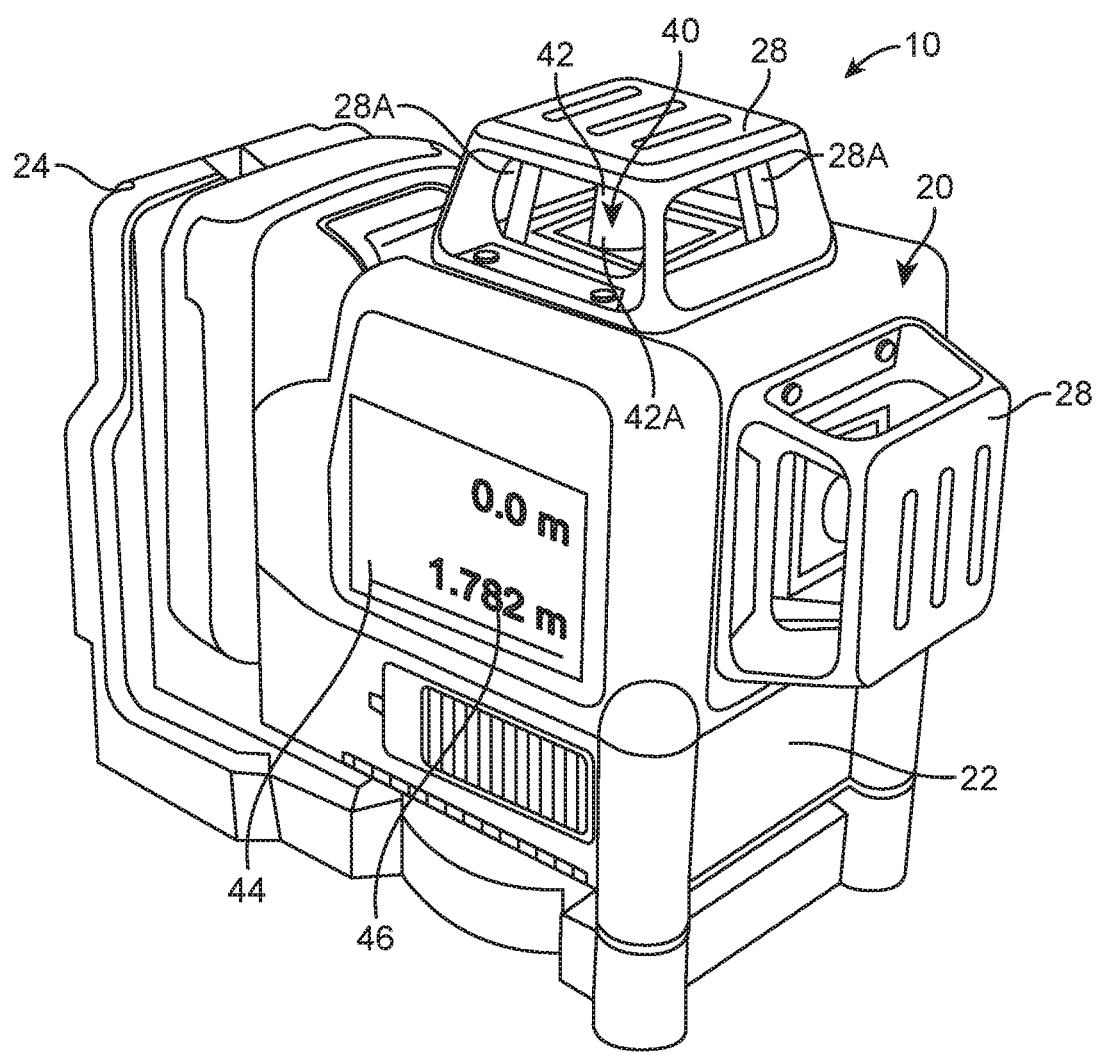
FIG. 2 shows an isometric view of laser level 10 depicting various components of housing assembly 20 and measurement assembly 40.
Figure 3:
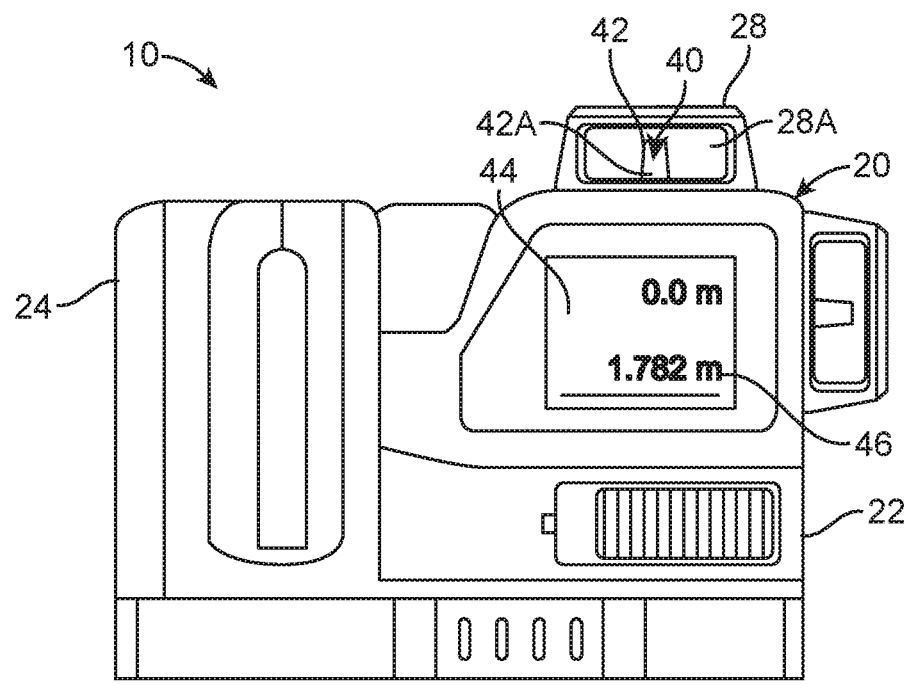
FIG. 3 illustrates a side view of laser level 10 depicting display window 44 in accordance to an embodiment of the present invention.
Figure 4:
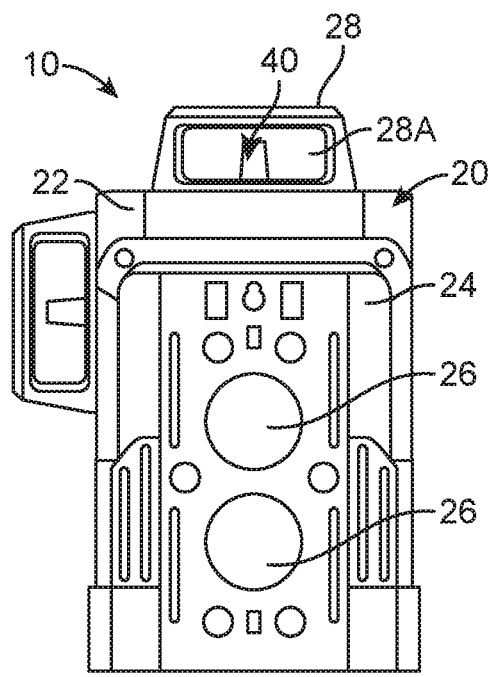
FIG. 4 is a representation of a rear view of laser level 10 depicting magnets 26 in accordance to an embodiment of the present invention.
Figure 5:
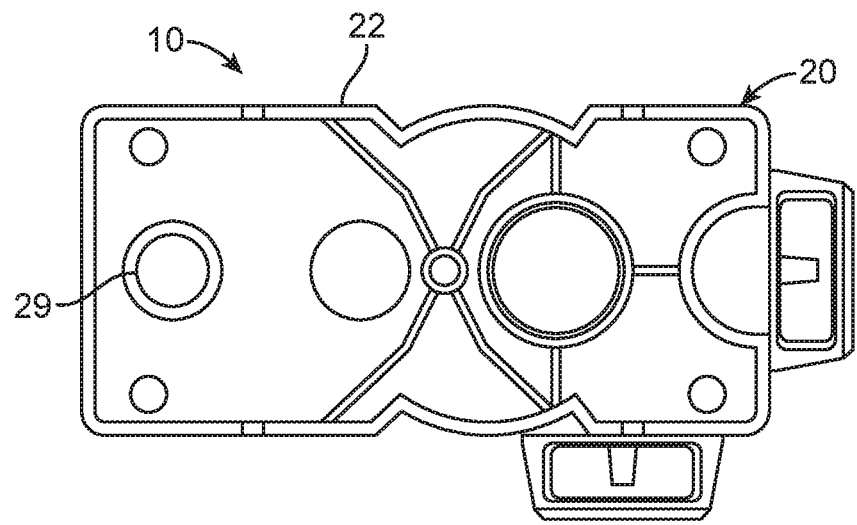
FIG. 5 shows a bottom view of laser level 10 depicting tripod mount 29 in accordance to an embodiment of the present invention.
Figure 6:
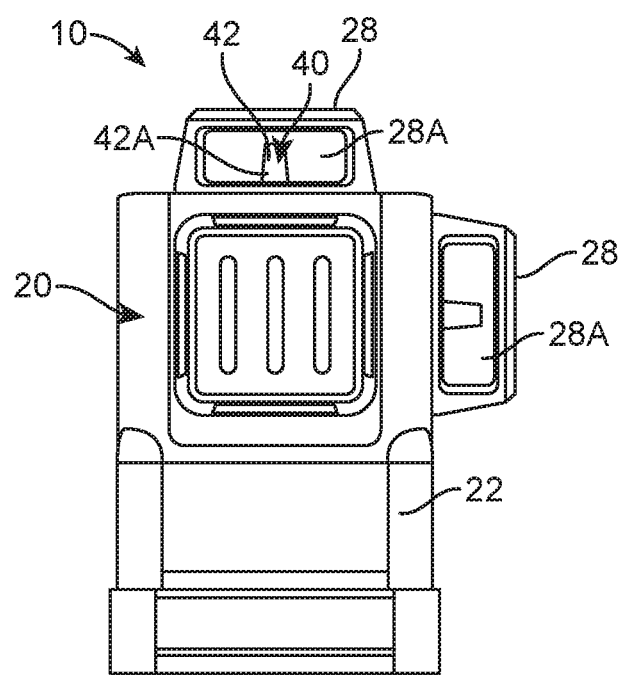
FIG. 6 illustrates a front view of laser level 10 in accordance to an embodiment of the present invention.
Figure 7:
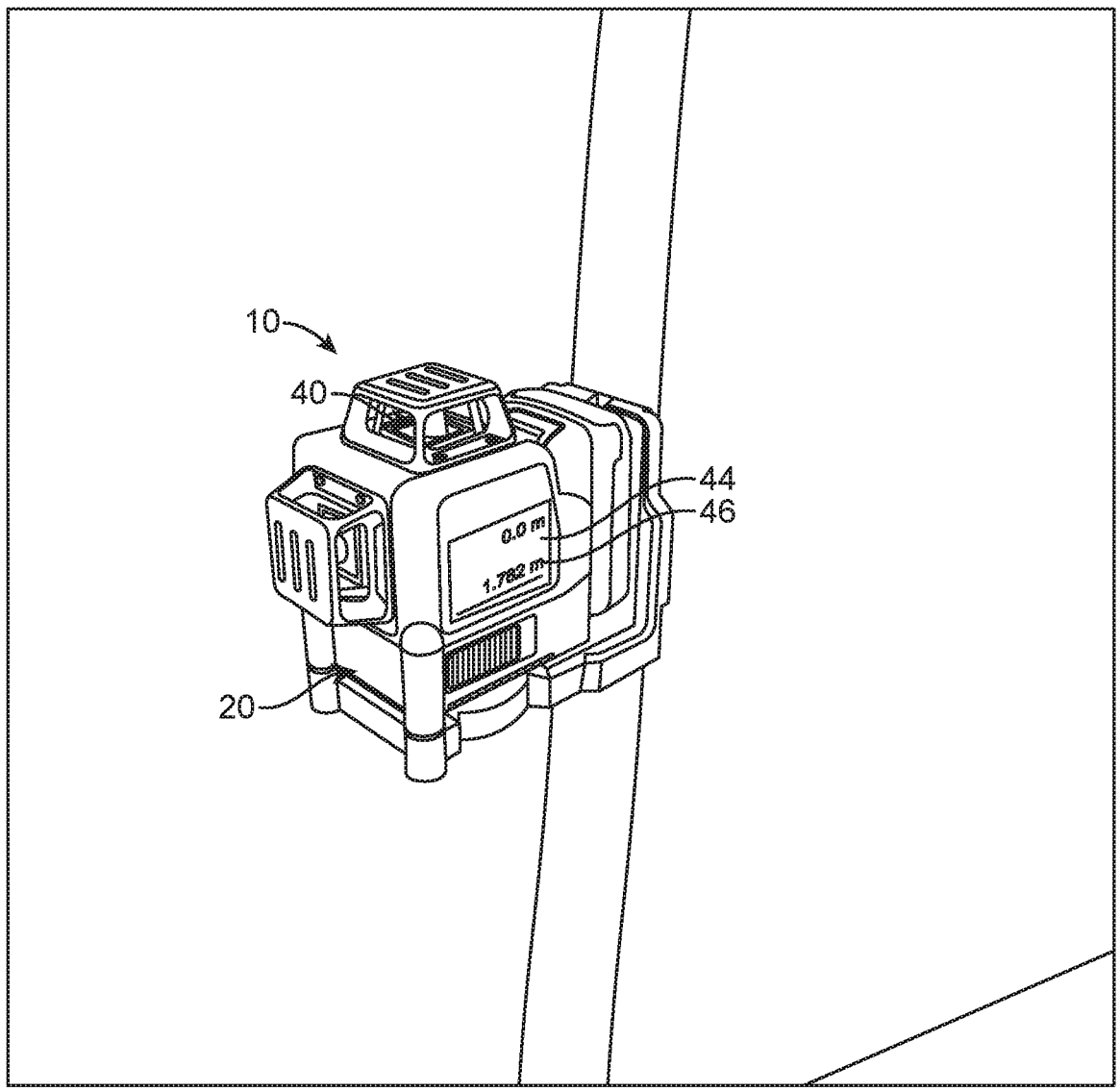
FIG. 7 represents an isometric view of laser level 10 in an operational setting being mounted onto a magnetic surface in accordance to an embodiment of the present invention.

Referring now to the drawings, where the present invention is generally referred to with numeral 10, it can be observed a laser level 10 that includes a housing assembly 20 and a measurement assembly 40.

Housing assembly 20 includes a body 22 having sidewalls, a top and bottom end, as well as a front and back end. In one embodiment, body 22 is of a rectangular variety and houses measurement assembly 40 therein. The provided figures observe body 22 having a rectangular shape. However, other embodiments may feature body 22 of varying shapes and sizes. Additionally, body 22 may be made of a heavy and durable material such as metal, carbon fiber, and the like. Body 22 should be made of a suitable material to withstand a harsh workplace environment such as a construction zone. Furthermore, body 22 should be configured in such a way that it is waterproof, shock proof, and self-leveling. In one embodiment, body 22 includes a mounting member 24 located on a back end of body 22. Mounting member 24 may be provided in a rectangular shape that is synonymous to body 22. Additionally, mounting member 24 may also be of the retractable and adjustable variety allowing a user to mount body 22 along various surfaces with flexibility. Mounting member 24 may further include magnets 26 located thereon. In one embodiment, magnets 26 may be provided as circular magnets located on a back end of body 22. The provided figures depict two circular magnets mounted onto a mounting member 24. However, other embodiments may feature magnets of varying size and variety. Body 22 may further include various laser housings 28 located along different locations of body 22. In one embodiment, laser housings 28 are located on a front end, a top end, and a sidewall of body 22. Additionally, laser housings 28 may be of a cubic rectangular shape protruding outwardly from said body 22. Furthermore, laser housings 28 may further include windows 28A surrounding an outer surface area. In one embodiment, windows 28A are rectangular windows located along four sidewalls of laser housings 28 that allow the light from measurement assembly 40 to pass through. The provided figures depict windows 28A as having a rectangular shape. However, other embodiments may feature windows 28A of varying shapes and sizes. Housing assembly 20 further includes a tripod mount 29 located on a bottom end of body 22. In one embodiment, tripod mount 29 may be provided as an opening having inner threads located on the bottom end of body 22. Tripod mount 29 receives a tripod 50 to aid a user in appropriately leveling the body 22 in a construction environment to obtain an accurate measurement. Alternatively, body 22 may be mounted onto a wall surface 70 provided that it is of the metal variety. A user may then couple magnets 26 to a metal portion of wall surface 70 to then be used to record accurate measurements of a construction site. Body 22 may also be mounted to a variety of wall surfaces 70 to then obtain accurate measurement data.

Measuring assembly 40 includes lasers 42 that are housed within laser housings 28 of body 22. In the present embodiment, lasers 42 are housed within each laser housing 28 located on the front end, top end, and a sidewall of body 22. Additionally, lasers 42 includes a light beam color 42A that can be changed from either a green or red color. This feature is an important and novel benefit to the present invention as the present laser levels do not include the capability of being able to change from a green color or red color. In one embodiment, the use of light beam color 42A allows a user to measure an environment in accordance to their preference. It is known that the green laser often has greater clarity and distance than the red laser. In one embodiment, the green laser projects a light beam from up to 100 feet while the red laser may only project a light beam from up to 50 feet. However, people often believe that different color beams may be suitable for certain environments and other areas of varying visibility. The present invention allows a user the flexibility of being able to choose their desired laser color to best suit their needs. Measuring assembly 40 further includes a display window 44 located along a sidewall of body 22. In one embodiment, display window 44 is of a rectangular LED display screen variety. However, other embodiments may feature display window 44 of other types of screens. Additionally, display window 44 is configured to display measurement indicia 46 that is acquired by lasers 42 from being projected onto a wall surface 70. In one embodiment, measurement indicia 46 is provided in the metric measuring system. In another embodiment, measurement indicia 46 is provided in the imperial measurement system. The display window 44 is another novel feature of the present invention that is absent from the prior art. The prior art fails to provide a laser level with the capabilities of being able to provide measurement indicia from the lasers. The present invention displays measurement indicia 46 on an easily observed display window for a user's convenience. As a result, a user may then have accurate measurements of their work area and complete their projects faster.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for a laser level, comprising:
   a. a housing assembly including a rectangular body having a plurality of laser housing elements, said rectangular body further including a mounting member having magnets thereon, wherein said mounting member is a flat mounting structure that is positioned in an abutting engagement with an outer sidewall of said rectangular body, wherein said magnets are circular magnet structures which are embedded within the mounting member, said magnets being exposed from the mounting member when embedded therein, wherein said mounting member is adjacently positioned with respect to a bottom sidewall of said rectangular body, wherein said bottom sidewall of said rectangular body includes a tripod mount; and
   b. a measurement assembly including a plurality of lasers housed within said plurality of laser housing elements, wherein said plurality of lasers include light outputs wherein the color of the light beam can be changed from either green or red, wherein said plurality of lasers outputs a green light beam with a range up to 100 feet, wherein said plurality of laser outputs a red light beam with a range up to 50 feet, a display window located on a sidewall of said rectangular body that displays measurement indicia acquired by said plurality of lasers, wherein said display window is a rectangular LED display screen in abutting engagement on a sidewall of said rectangular body.

2. The system for a laser level of claim 1 wherein said rectangular body is mounted to a tripod.

3. The system for a laser level of claim 1 wherein said magnets are coupled to a magnetic surface of a wall.

4. The system for a laser level of claim 1 wherein said plurality of laser housing elements include windows.

5. The system for a laser level of claim 1 wherein said plurality of laser housing elements are located on a front end, a top end, and a sidewall of said rectangular body.

6. The system for a laser level of claim 1 wherein said display window displays said measurement indicia in metric measurements.

7. The system for a laser level of claim 1 wherein said display window displays said measurement indicia in imperial measurements.

8. A system for a laser lever, consisting of:
   a. a wall;
   b. a tripod;
   c. a housing assembly including a rectangular body having a front end, a back end and a first sidewall, wherein said back end includes a retractable mounting member, wherein said retractable mounting member is rectangular in shape, said retractable mounting member further including two magnets located within a center portion, wherein said retractable mounting member is a flat mounting structure that is positioned in an abutting engagement with a back end sidewall of said rectangular body, wherein said two magnets are circular magnet structures which are embedded within the retractable mounting member, said two magnets being exposed from the retractable mounting member when embedded therein, wherein said mounting member is adjacently positioned with respect to a bottom sidewall of said rectangular body, a first laser housing located on said front end, a second laser housing located on a top end of said rectangular body, a third laser housing located on said first sidewall of said rectangular body, wherein said first laser housing, said second laser housing and said third laser housing are square housings that include windows thereon, said bottom sidewall of said rectangular body further including a tripod mount to receive a top end of said tripod, wherein said tripod mount is an opening having inner threads;

d. a measurement assembly including lasers located within said first laser housing, said second laser housing, and said third laser housing, wherein said lasers have a light beam color that can be changed from either green or red, wherein said lasers of the first, second, and third laser housings outputs a green light beam with a range up to 100 feet, wherein said lasers of the first, second, and third laser housings outputs a red light beam with a range up to 50 feet a display window located on a second sidewall of said rectangular body, wherein said display window is rectangular in shape, wherein said display window displays measurement indicia acquired by said lasers, wherein said measurement indicia is in a metric system wherein said display window is a rectangular LED display screen in abutting engagement with the second sidewall of said rectangular body.

* * * * *